United States Patent
Kaplan et al.

(10) Patent No.: US 6,900,608 B2
(45) Date of Patent: May 31, 2005

(54) APPARATUS FOR CONTROLLING A MOTOR

(75) Inventors: Norton Kaplan, Hopkinton, MA (US); David Lee, Ashburnham, MA (US)

(73) Assignee: Automated Assemblies Corporation, Clinton, MA (US)

( * ) Notice: Subject to any disclaimer, the term of this patent is extended or adjusted under 35 U.S.C. 154(b) by 60 days.

(21) Appl. No.: 10/417,858

(22) Filed: Apr. 17, 2003

(65) Prior Publication Data

US 2004/0207354 A1 Oct. 21, 2004

(51) Int. Cl.⁷ .................................................. B25J 9/18
(52) U.S. Cl. .............................. 318/568.11; 318/568.13
(58) Field of Search ........................... 318/567, 568.1, 318/568.11, 568.13, 568.2, 568.21, 568.23

(56) References Cited

U.S. PATENT DOCUMENTS

| | | | |
|---|---|---|---|
| 4,864,205 A | * 9/1989 | Fisher et al. ............ 318/568.11 |
| 5,201,630 A | * 4/1993 | Ishida et al. .............. 414/744.5 |
| 5,373,439 A | * 12/1994 | Jeon ............................. 700/63 |
| 5,959,425 A | 9/1999 | Bieman et al. ......... 318/568.15 |
| 6,127,792 A | * 10/2000 | Kamiya et al. ............. 318/432 |
| 6,246,923 B1 | * 6/2001 | Sugimura et al. ........... 700/218 |
| 6,304,050 B1 | 10/2001 | Skaar et al. ........... 318/568.11 |
| 6,328,523 B1 | 12/2001 | Watanabe et al. ........... 414/416 |

FOREIGN PATENT DOCUMENTS

EP  1 085 389 A1  3/2001  ......... G05B/19/418

* cited by examiner

*Primary Examiner*—Bentsu Ro
(74) *Attorney, Agent, or Firm*—Bromberg & Sunstein LLP (57) ABSTRACT

An apparatus optimizes arm velocity when the arm is carrying a given payload. More specifically, the apparatus controls the performance of a motor so that the motor can move the arm at an arm maximum velocity when the arm is carrying the given payload. To that end, the apparatus includes an information input to receive motor performance information, and a controller operatively coupled with the information input. The controller is capable of determining the arm maximum velocity from the motor performance information. The controller also is capable of causing the motor to move the arm at the arm maximum velocity.

20 Claims, 8 Drawing Sheets

APPARATUS FOR CONTROLLING A MOTOR

FIELD OF THE INVENTION

The invention generally relates to motors and, more particularly, the invention relates to controlling a motor that moves one or more external items, such as a robotic arm.

BACKGROUND OF THE INVENTION

Robotic arms are used in a wide variety of manufacturing processes. For example, injection molding processes commonly use robotic arms to move molded parts between two spaced locations (e.g., from a mold to a holding area).

Those skilled in the art know that the efficiency of robot-based manufacturing processes is closely related to the actual velocities at which the robotic arms move. Specifically, the faster the arms move, the more parts that typically can be produced. Undesirably, however, many manufacturing processes have robotic arms that move at velocities that are much slower than their potential maximum velocities. Consequently, the total number of parts produced per hour is lower than it would be if the robotic arms ran closer to their potential maximum velocities. This lag can have a profound impact on the overall cost effectiveness of a manufacturing process.

Molding machine operators generally attempt to avoid this problem by estimating the maximum arm velocity before the manufacturing process begins. To that end, the operator determines an initial estimated maximum arm velocity based upon (among other things) the maximum motor torque and velocity, the mass of the part to be carried and its associated tooling, and the path of the arm. The operator then runs the machine at that initial estimated maximum velocity to determine if such velocity should be modified. The operator then repeats this process until a final estimated maximum velocity is determined.

There are a number of problems with this inefficient and time consuming approach. In particular, as noted above, the final maximum velocity often is significantly less than the actual maximum velocity at which the robotic arm can run. Consequently, part output volume is reduced. Moreover, there are times when a robotic arm separately carries two different types of parts during a single process. For example, the robotic arm may carry a first part type for a first length of travel, place that first part type down, and then carry a new (different) part type for a second length of travel. When this happens, the maximum velocity determined by the operator may be inapplicable to the new part type. The robotic arm thus moves at a velocity that is not optimized for the new part type. In other words, the robotic arm may move at a velocity that is significantly slower than the potential maximum velocity (for the second type of part). Further compounding these problems, many robotic arms simply shut down when their actual velocity is sufficiently slower than the maximum velocity entered by the operator.

SUMMARY OF THE INVENTION

In accordance with one aspect of the invention, an apparatus optimizes arm velocity (i.e., also including, in many instances, acceleration and deceleration) when the arm is carrying a given payload. More specifically, the apparatus controls the performance of a motor so that the motor can move the arm at an arm maximum velocity when the arm is carrying the given payload. To that end, the apparatus includes an information input to receive motor performance information, and a controller operatively coupled with the information input. The controller is capable of determining the arm maximum velocity from the motor performance information. The controller also is capable of causing the motor to move the arm at the arm maximum velocity.

The apparatus also may include an increment module operatively coupled with the controller. The increment module is capable of increasing the motor velocity toward the arm maximum velocity in discrete amounts. The controller also may be capable of causing the motor to move the arm a predetermined amount that is less than the arm maximum velocity. The predetermined amount illustratively is a function of the arm maximum velocity.

In some embodiments, the apparatus has an interface to forward a message to a trajectory generator that calculates trajectory information of the arm. The message has data that causes the trajectory generator to recalculate trajectory data based upon the maximum velocity. In other embodiments, the apparatus also has an interface to forward a clamp message to a trajectory generator that attempts to increase motor velocity when the motor is not running at a predetermined velocity. The clamp message causes the trajectory generator to stop attempting to increase the motor velocity when the motor is not running at the predetermined velocity.

A following error module capable of calculating following error of the motor also may be used. In such embodiment, the following error of the motor is calculated as a function of the motor performance information. The arm maximum velocity is a function of the following error. Among other things, the arm may be a robotic arm.

In accordance with another aspect of the invention, a method of controlling a motor capable of moving an arm (that is capable of moving at an arm maximum velocity when carrying a given payload) receives motor performance information, and then dynamically determines the arm maximum velocity based on the motor performance information. The method causes the motor to move the arm at a velocity that is a function of the arm maximum velocity.

In some embodiments, the arm maximum velocity is dynamically determined by calculating the following error of the motor, and then determining if the following error equals or exceeds a maximum value. In other embodiments, the arm maximum velocity is dynamically determined by repeatedly determining the arm maximum velocity as the arm moves during a single movement. Moreover, the motor may move the arm at a velocity that is a predetermined amount less than the arm maximum velocity.

Illustrative embodiments of the invention are implemented as a computer program product having a computer usable medium with computer readable program code thereon. The computer readable code may be read and utilized by a computer system in accordance with conventional processes.

BRIEF DESCRIPTION OF THE DRAWINGS

The foregoing and advantages of the invention will be appreciated more fully from the following further description thereof with reference to the accompanying drawings wherein.

DESCRIPTION OF ILLUSTRATIVE EMBODIMENTS

In illustrative embodiments of the invention, a robotic arm dynamically adjusts its operating velocity based upon the weight of the payload (i.e., a part produced by a manufacturing process and/or its accompanying end of arm tool, discussed below) it is carrying. For example, the robotic arm may have a higher maximum velocity when carrying a lighter payload than when it is carrying a relatively heavier payload. Embodiments of the invention thus monitor arm movement and dynamically adjust the maximum velocity to optimize system performance. Details of various embodiments are discussed below.

Figure 1:
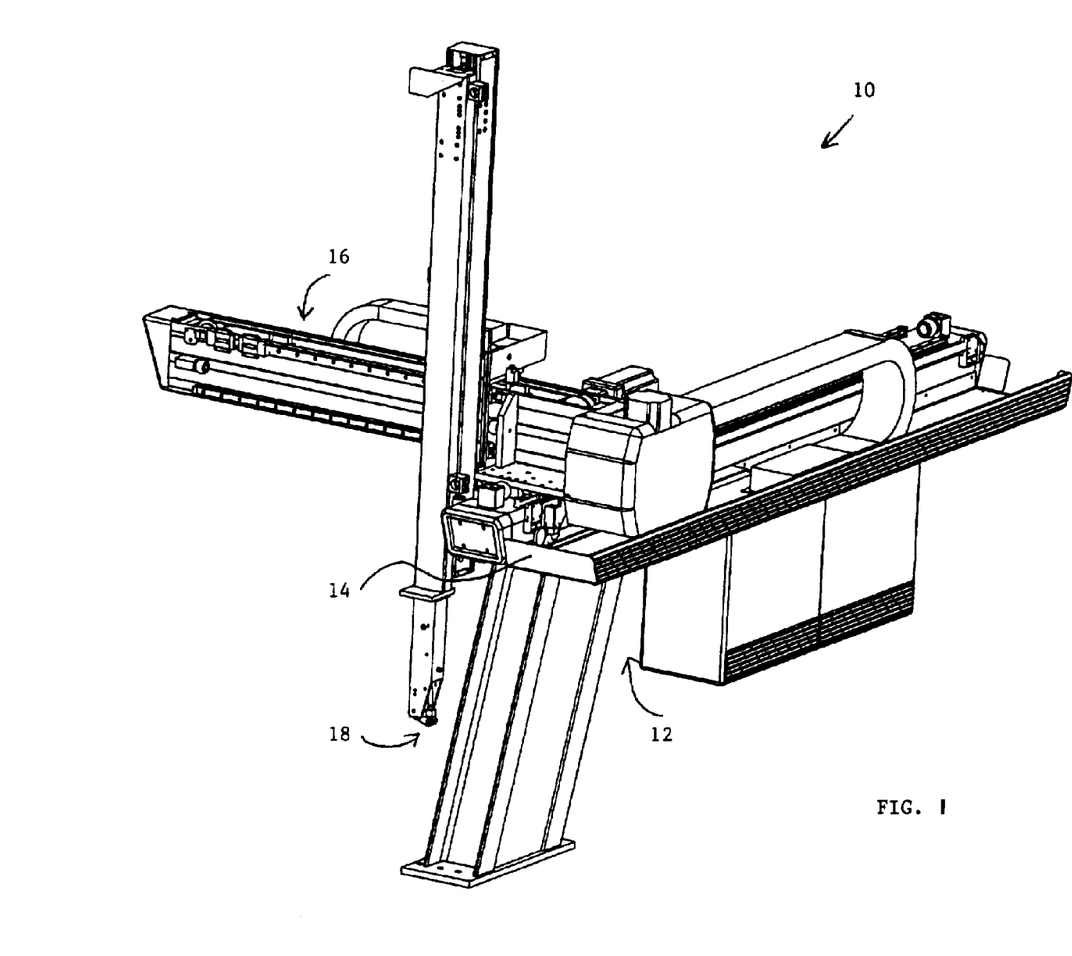
FIG. 1 schematically shows an exemplary robot that may be used with illustrative embodiments of the invention.

FIG. 1 schematically shows a robot 10 that may be used with illustrative embodiments of the invention. The robot 10 includes, among other things, a main body 12 having a base 14, and a hinged arm 16 capable of moving in up to three dimensions. The hinged arm 16 terminates at a mounting and rotating surface 18 that couples with an end of arm tool (not shown). As known in the art, an end of arm tool includes various implements for manipulating a part (i.e., a payload). For example, among other things, the end of arm tool may include one or more grappling tools for carrying a part (e.g., suction cups and/or hinged fingers) and tools for processing a part (e.g., a welding tool). Although not shown, some robots include multiple arms 16 that are capable of cooperatively operating simultaneously and/or serially.

The robots discussed herein are used for conventional manufacturing processes. For example, such robots may be used to produce a molded part in a conventional injection molding process. It nevertheless should be noted that discussion of such robots is exemplary and thus, not intended to limit the scope or application of various embodiments of the invention. Accordingly, principles of various embodiments can be applied to robots used in other applications (e.g., automotive applications). As known by those skilled in the art, the robotic arm 16 may make multiple moves during a single cycle. For example, the arm 16 may make a first (downward) move to grab a part, a second (upward) move, a third (lateral) move to move the part to a laterally spaced location, and a fourth (downward) move to place the part in another location.

Figure 2:
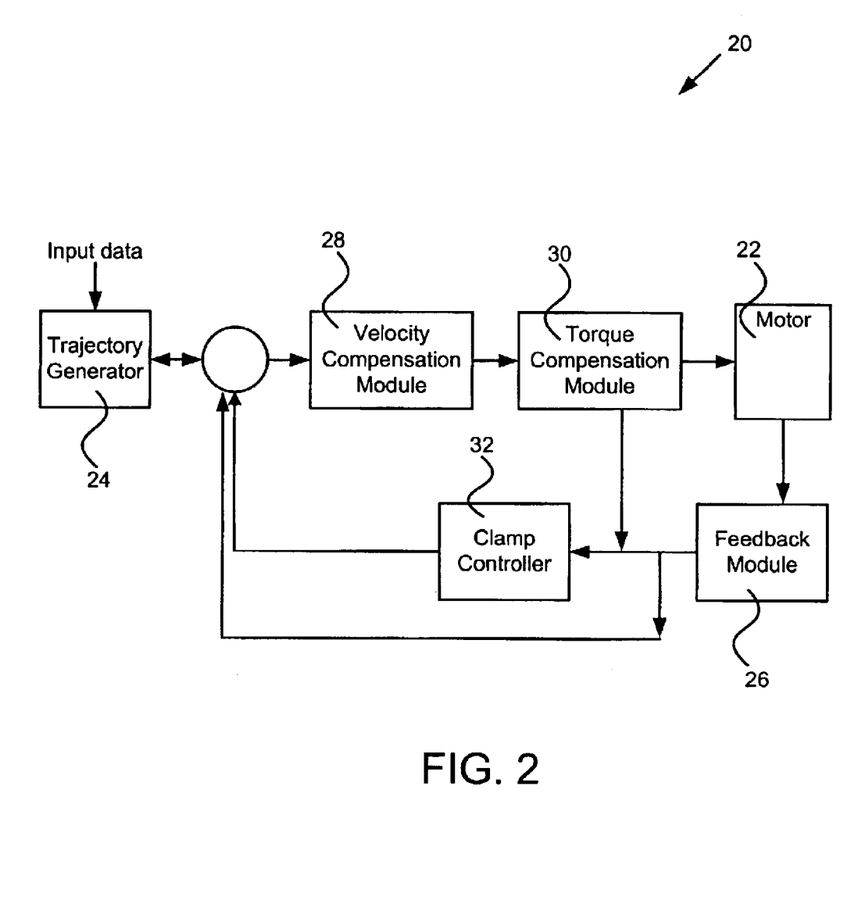
FIG. 2 is a functional diagram of a first embodiment of the invention in which motor velocity is clamped.

FIG. 2 schematically shows a functional block diagram of a velocity control system 20 configured in accordance with a first embodiment of the invention. In summary, this embodiment detects when the robotic arm 16 is operating (i.e., moving) at its maximum velocity (when carrying a given payload) and clamps the arm velocity at this maximum velocity. Those skilled in the art understand that the maximum velocity has associated acceleration and deceleration values. Accordingly, discussion of maximum velocity includes such associated acceleration and deceleration (i.e., the motion profile of the robotic arm 16 for a given move).

To that end, the velocity control system 20 includes a conventional servo motor 22 that physically moves the robotic arm 16, and a plurality of control modules that control motor performance. The plurality of control modules includes a conventional trajectory generator 24 for both creating trajectory data (i.e., path and velocity data) and ensuring that the motor 22 operates in accord with these parameters. Accordingly, the trajectory generator 24 keeps track of operating parameters by monitoring motor performance via a feedback module 26 (e.g., an encoder). In various discussed embodiments, motor performance includes arm position information (i.e., the location of the arm within a specific move). In some embodiments, however, motor performance information includes velocity information and/or the motor/arm motion profile. Accordingly, motor performance includes any information that can be used to control the robotic arm 16 in accordance with various embodiments discussed herein.

As known by those skilled in the art, the feedback module 26 substantially continuously forwards motor performance information back to the trajectory generator 24. Upon receipt, the trajectory generator 24 first calculates the actual deviation from the intended performance (i.e., following error, discussed below), and then forwards commands to other control modules to correct the deviation.

To correct the deviations, the plurality of control modules also includes conventional velocity and torque compensation modules 28 and 30 for respectively compensating for velocity and torque error that occur when the motor 22 is running. More specifically, in response to commands from the trajectory generator 24, the velocity and torque compensation modules 28 and 30 make appropriate adjustments that drive the motor 22 toward the intended performance. For example, if the motor 22 is operating at a velocity that is slower than that intended by the trajectory generator 24, then the trajectory generator 24 forwards a command (requesting more velocity) to the velocity compensation module 28. The velocity compensation module 28, together with the torque compensation module 30, responsively cause the motor 22 to run faster. To that end, the torque compensation module 30 may deliver more current to the motor 22.

In alternative embodiments, the feedback module 26 does not deliver motor performance data. Rather, the feedback module may deliver mass/weight information relating to the payload. For example, a weight sensor may weigh the payload (either or both the part and tool) and deliver that weight datum back to some other component or module in the system 20. The receiving module then may use the weight datum to set arm velocity. To that end, the module may use a look-up table associating weights to arm velocities.

The trajectory generator 24, velocity compensation module 28, torque compensation module 30, motor 22, and feedback module 26 may be any conventional devices used for the stated purposes. For example, below is a list of specific devices that may be used to implement these components. It should be noted that these specific devices are exemplary and not intended to limit the scope of the invention. Accordingly, other similar devices may be used to practice this and related embodiments of the invention.

Trajectory generator 24: EXMP SYNQNET motion controller from Motion Engineering Inc. of Santa Barbara, Calif.;

Velocity compensation module 28: The velocity compensation module within the EXMP SYNQNET motion controller noted above.

Torque compensation module 30: KOLLMORGEN amplifier from Danaher Motion Corporation of Rockford, Ill.;

Motor 22: PACIFIC SCIENTIFIC motor from Danaher Motion Corporation; and

Feedback module 26: feedback module within the PACIFIC SCIENTIFIC motor.

Figure 3:
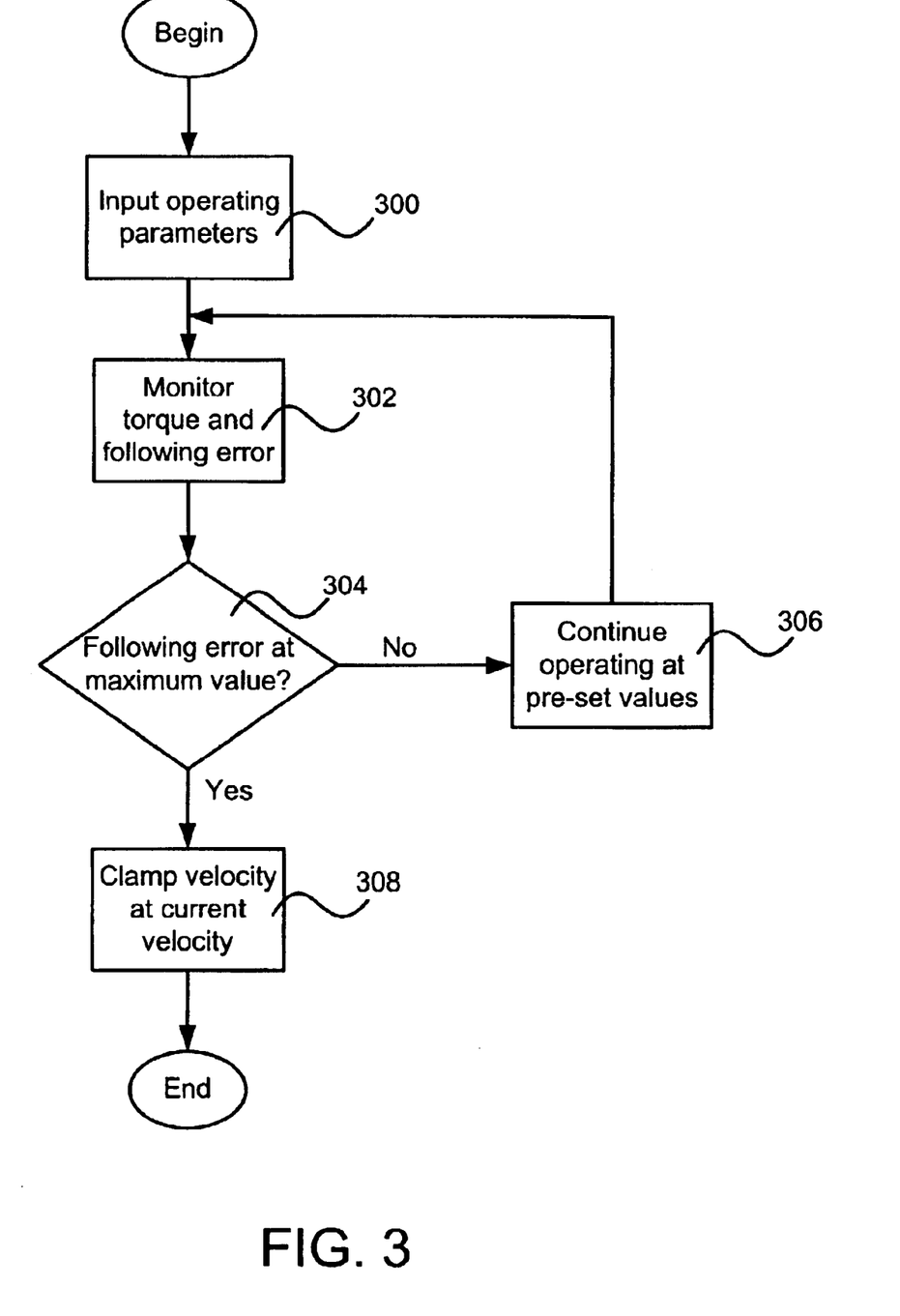
FIG. 3 shows a process implementing the first embodiment shown in FIG. 2.

In accordance with illustrative embodiments of the invention, the plurality of modules also includes a clamp controller 32 that detects the maximum velocity and clamps robotic arm velocity at that velocity. FIG. 3 shows a process used by this embodiment of the invention to produce this result. This process may be simultaneously executed for all degrees of freedom of the robotic arm 16 (e.g., X, Y, and Z directions). The process begins at step 300, in which operating parameters are entered via a user interface (e.g., a graphical user interface on a computer system). Among other things, these parameters may include maximum velocity and acceleration data, and a maximum following error (discussed below), and may be determined by any conventional means (e.g., via experimentation or prior experience). Unlike this step, the remaining steps of this process may be repeated multiple times during each move and/or cycle of the robotic arm 16.

The process thus continues to step 302, in which the clamp controller 32 monitors both the torque compensation module 30 to receive torque information, and the feedback module 26 to receive following error information. As known by those skilled in the art, the following error is a measure of the difference between the actual location of the arm 16 and the intended location of the arm 16 at a specific time. For example, if the actual location of the arm 16 at a given time is one inch behind the intended location of the arm 16 (at that same given time), then the following error is one inch. In some embodiments, the clamp controller 32 calculates the following error from the feedback information. In other embodiments, some other module may calculate the following error and forward such value to the clamp controller 32.

The clamp controller 32 then determines (at step 304) if the actual following error is equal to or greater than the maximum following error value entered via the user interface at step 300. In some embodiments, rather than receiving the maximum following error value via the user interface, the clamp controller 32 merely accesses a local or remote memory having a pre-loaded maximum following error value. If the actual following error is less than the maximum value, then the process continues to step 306, in which the motor 22 continues to operate based upon the pre-set values entered at step 300. Accordingly, in this case, the motor 22 continues to operate at the maximum velocity and acceleration entered via the user interface.

Conversely, if the clamp controller 32 determines at step 304 that the actual following error is equal to or greater than the maximum following error, then it clamps the velocity at its current value (step 308). In particular, because the following error has reached the maximum, the motor 22 is considered to be operating at its maximum velocity for the given payload it is carrying. To those ends, the clamp controller 32 detects this condition, and forwards a stop command to the trajectory generator 24. The stop command includes data that, when received by the trajectory generator 24, causes the trajectory generator 24 to stop issuing commands (to the velocity compensation and torque compensation modules 28 and 30) to increase motor velocity. For example, the stop command may include specific function calls that are capable of being read and acted upon by the trajectory generator 24. This process thus effectively clamps the motor velocity to its maximum value when carrying a given payload.

In some embodiments, the clamp controller 32 may include additional functionality that continues to monitor the motor velocity. In some embodiments, if the velocity drops below the clamped value, then the clamp controller 32 may forward a resume command (having specific function calls) to the trajectory generator 24. Receipt of the resume command permits the trajectory generator 24 to resume its normal function of attempting to maintain the velocity at the input value. Of course, this embodiment again may continue to monitor the following error and execute the processes discussed herein.

It should be noted that torque produced by the motor 22 typically is at a maximum value when the actual following error is equal to or greater than the maximum following error. The velocity of the motor 22 therefore cannot increase. There could be instances, however, where the actual following error is equal to or greater than the maximum following error, while the torque is not at its maximum value. In such case, it is anticipated that the system 20 will correct itself by increasing the torque. Accordingly, in some embodiments (including those discussed below), if the torque is not at its maximum value (as rated for the specific motor or determined by the clamp controller 32), then the relevant controller does not set (e.g., clamp, in the first embodiment) the velocity even if the actual following error has reached the maximum set value. In those embodiments, the relevant controller sets the velocity to the current (i.e., maximum) velocity when two conditions are met—namely, when 1) the actual following error is equal to or greater than the maximum following error, and 2) the actual torque is at its maximum value.

Rather than clamping at the maximum velocity, some embodiments of the invention reduce the velocity to ensure that the arm 16 does not move too rapidly. For example, after it determines the maximum velocity, the relevant controller may reduce the actual velocity by some function, such as by a percentage or absolute amount.

It should be reiterated that the maximum arm velocity is expected to vary based upon the mass of the payload carried by the arm 16. Accordingly, various embodiments of the invention may be considered to dynamically carry a payload at a maximum velocity that is customized to such payload.

Figure 4:
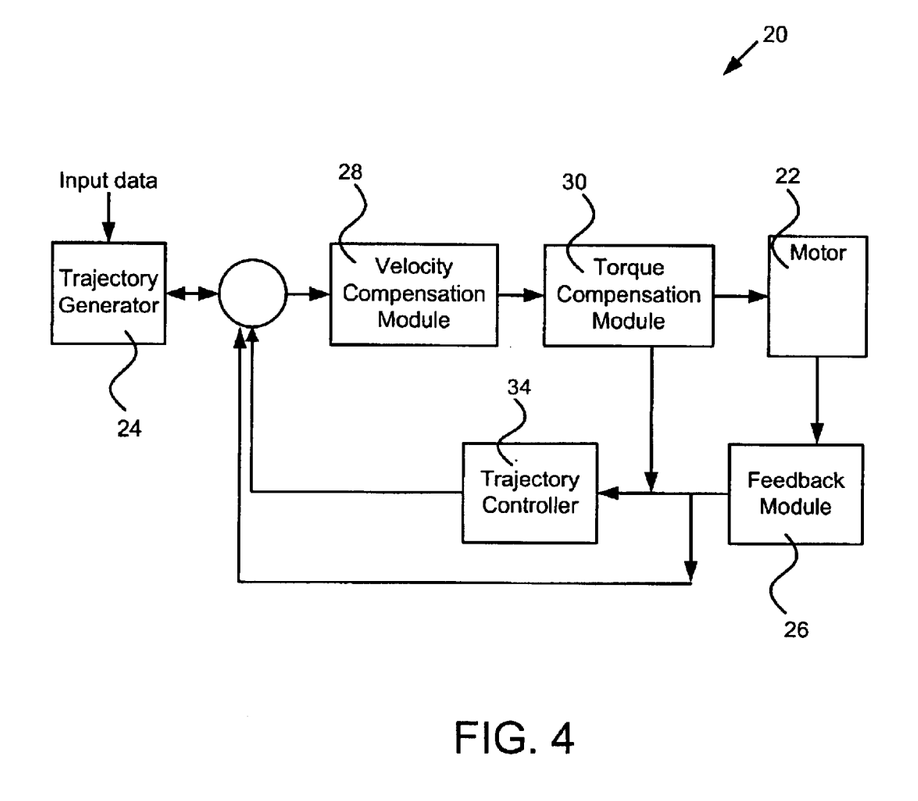
FIG. 4 is a functional diagram of a second embodiment of the invention in which the robotic arm trajectory is modified.

FIG. 4 schematically shows a functional diagram of a second embodiment of the invention. In a manner similar to the first embodiment discussed above, this embodiment also has a trajectory generator 24, velocity compensation module 28, torque compensation module 30, motor 22, and feedback module 26. Instead of a clamp controller 32, however, this embodiment has a trajectory controller 34 that both determines the maximum velocity and causes the trajectory generator 24 to recalculate trajectory data based upon the maximum velocity.

Figure 5:
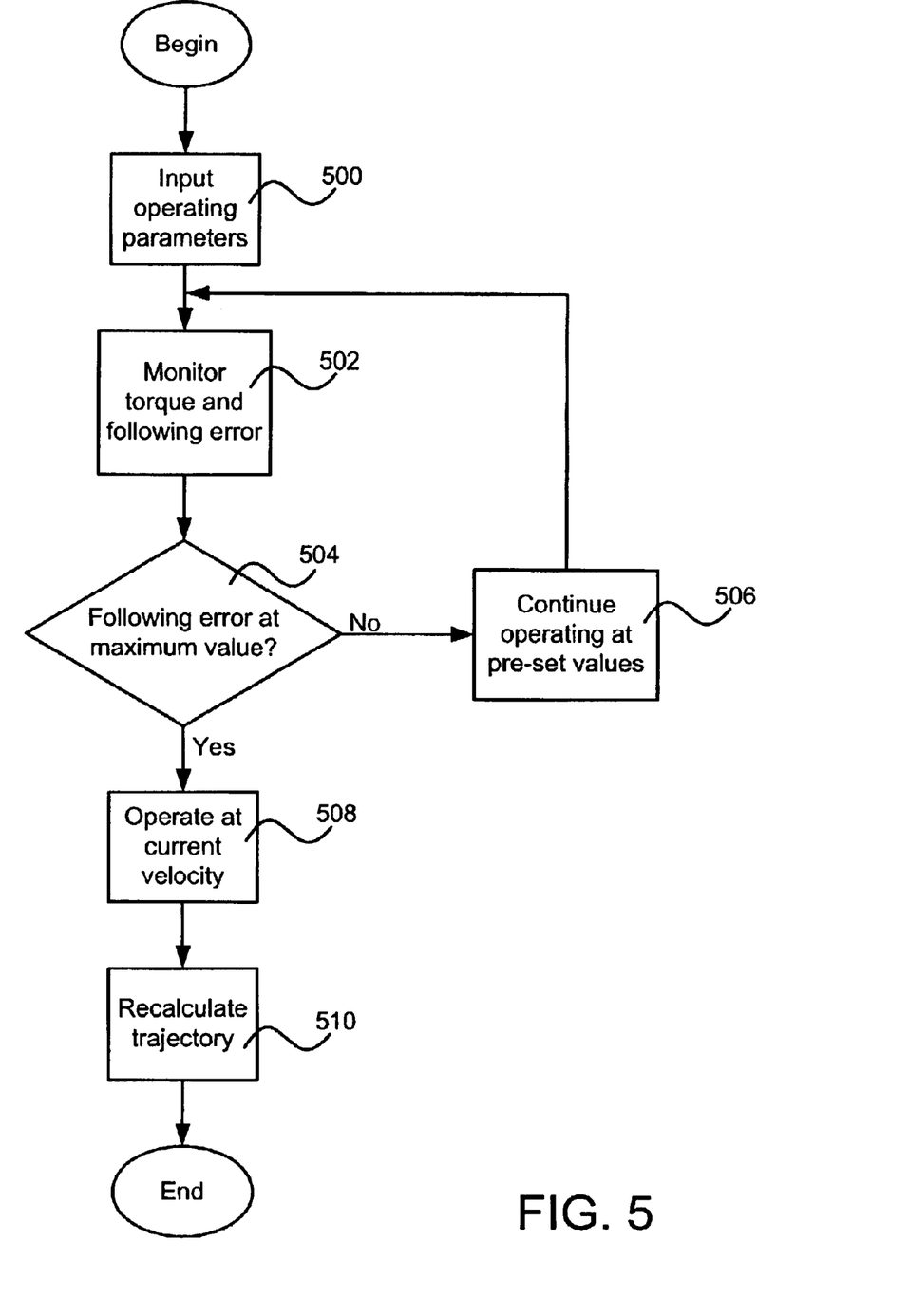
FIG. 5 shows a process implementing the second embodiment shown in FIG. 4.

FIG. 5 shows a process used by this embodiment of the invention to provide these results. The first several steps of this process are similar to that shown in FIG. 3. Specifically, the process begins at step 500, in which operating parameters are entered via a user interface (e.g., a graphical user interface on a computer system). Among other things, these parameters may include maximum velocity and acceleration data, and a maximum following error. The remaining steps of the process then may be repeated multiple times during each move of the robotic arm 16.

The process continues to step 502, in which the trajectory controller 34 monitors both the torque compensation module 30 to receive torque information, and the feedback module 26 to receive following error information. In some embodiments, the trajectory controller 34 calculates the following error from the feedback information. In other embodiments, some other module may calculate the following error and forward such value to the clamp controller 32.

The trajectory controller 34 then determines at step 504 if the actual following error is equal to or greater than the maximum following error value entered via the user interface at step 500. In some embodiments, rather than receiving the maximum following error value via the user interface, the trajectory controller 34 merely accesses a local or remote memory having a pre-loaded maximum following error value. If the actual following error is less than the maximum value, then the process continues to step 506, in which the motor 22 continues to operate at the pre-set values entered at step 500. Accordingly, in this case, the motor 22 continues to operate based upon the maximum velocity and acceleration entered via the user interface.

Conversely, if the trajectory controller 34 determines at step 504 that the actual following error is equal to or greater than the maximum following error, then it 1) causes the motor 22 to operate at the current velocity (step 508), which is the maximum velocity, and 2) instructs the trajectory generator 24 to recalculate new trajectory information based upon this current velocity (step 510). It should be noted that these two steps can be executed in a different order, or effectively simultaneously.

To these ends, the trajectory controller 34 forwards a modify command (i.e., having specific trajectory generator function calls) to the trajectory generator 24 that, when received, causes the trajectory generator 24 to recalculate trajectory information based upon the current velocity. In other words, the trajectory information is revised as if the input parameters were entered with the current velocity as the maximum velocity. Accordingly, in a manner similar to the first embodiment, this embodiment dynamically determines the maximum velocity when carrying a given payload, and causes the robotic arm 16 to move at that velocity. Unlike the first embodiment, however, rather than clamping the velocity, this embodiment recalculates trajectory information based upon the maximum velocity, effectively causing the robotic arm 16 to move at that newly determined velocity.

Figure 6:
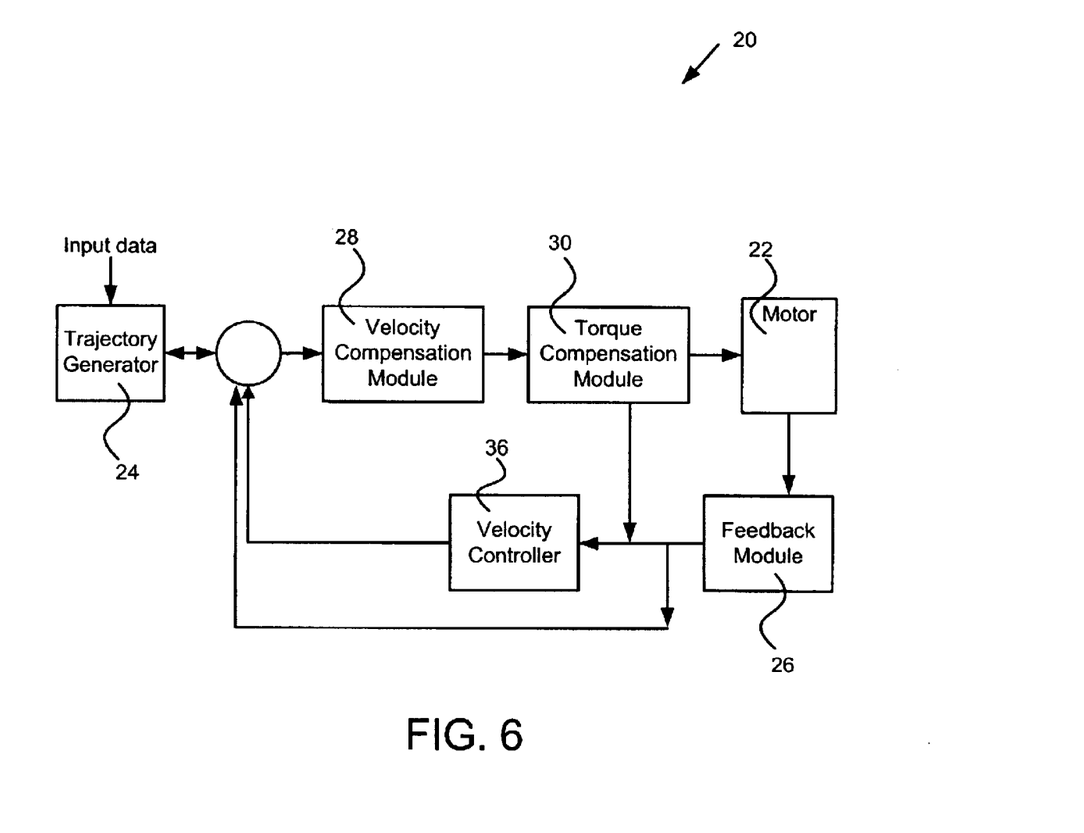
FIG. 6 is a functional diagram of a third embodiment of the invention in which motor velocity is gradually raised to a maximum value.

FIG. 6 schematically shows a functional diagram of a third embodiment of the invention. In a manner similar to the first and second embodiments discussed above, this embodiment also has a trajectory generator 24, velocity compensation module 28, torque compensation module 30, motor 22, and feedback module. Instead of a clamp controller 32 or trajectory controller 34, however, this embodiment has a velocity controller 36 that gradually increases the motor velocity until it reaches the maximum velocity (for each move) when carrying a given payload. For example, for a given set of sequential cycles, the velocity controller 36 gradually increases the arm velocity of each individual move from an initial velocity toward a maximum velocity. This process iterates between points until the maximum velocity for each move is attained, if possible (determined as discussed below). At that point, the arm 16 may operate at the maximum velocity for each move until the end of the sequence. A log file can be used to build a database of motor velocity performance.

Figure 7:
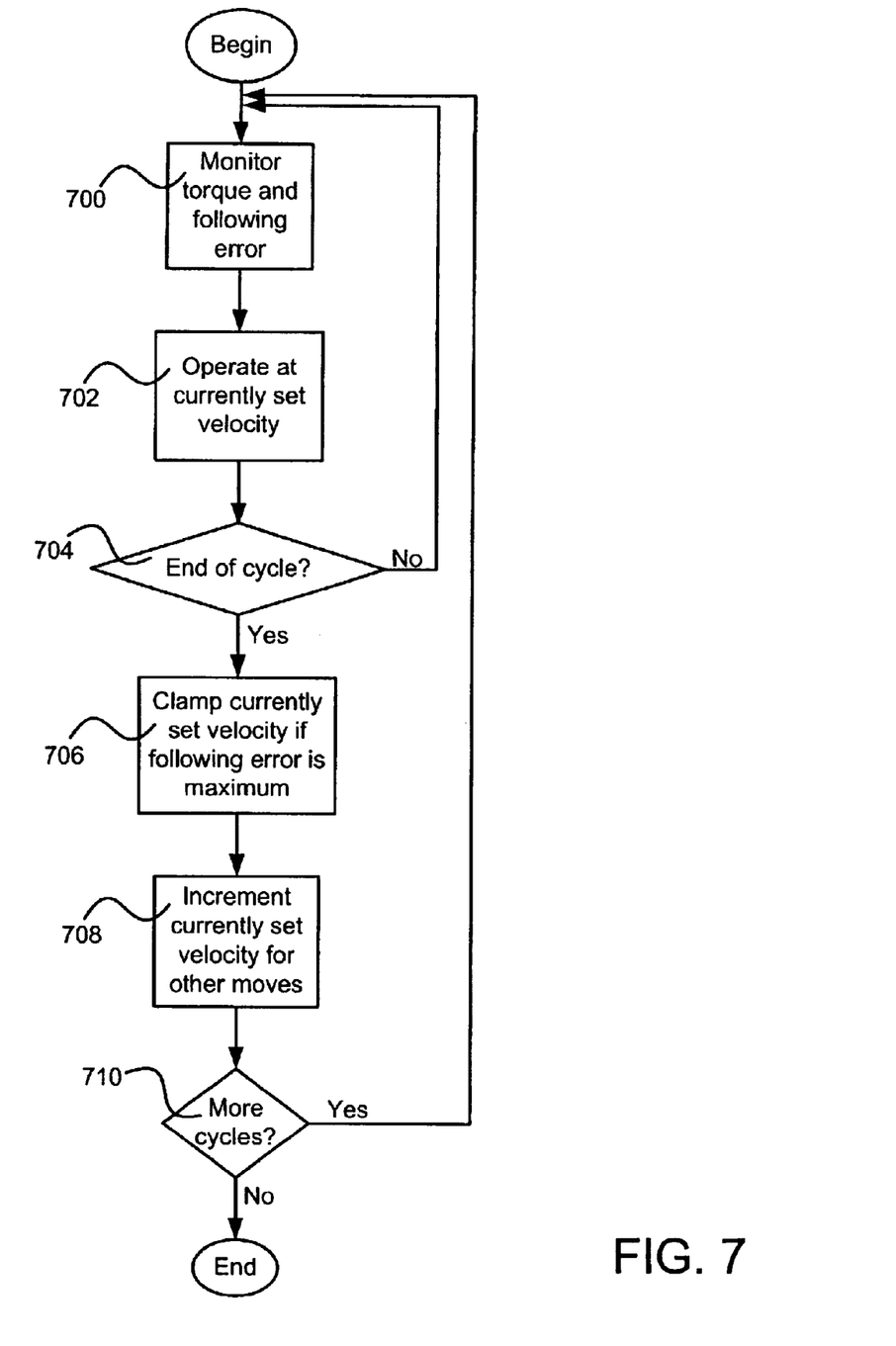
FIG. 7 shows a process implementing the third embodiment shown in FIG. 6.

FIG. 7 shows a process used by this embodiment of the invention to effectuate this process. The first step is similar to the monitoring steps shown in FIGS. 3 and 5. Specifically, after the input parameters are entered, the process begins at step 700, in which the velocity controller 36 both monitors the torque compensation module 30 to receive torque information, and the feedback module 26 to receive following error information.

It should be noted that the input parameters may include, among other things, starting velocity, acceleration data, a maximum following error, and an incremental velocity amount for increasing the velocity. The starting velocity may be any relatively low value, such as fifty percent of the rated maximum velocity of the motor 22. The incremental velocity amount may be some amount that is based upon, among other things, the part being moved and/or its associated tooling.

The process continues to step 702, in which the motor 22 is controlled to operate at the currently set velocity for one complete cycle. For each individual move, this currently set velocity may be a clamped velocity, a velocity that was incremented at the end of the immediately prior cycle, or the initial velocity entered by the operator (e.g., if it is the first cycle). Accordingly, in illustrative embodiments, during each move, the arm 16 may be moving at different speeds within the same cycle.

It then is determined at step 704 if the current cycle has ended. If not, then the process loops back to step 700. Conversely, if the current cycle has ended, then the currently set velocity for each move is examined and modified, if necessary. Specifically, if the cycle has ended, then the process continues to step 706, in which the currently set velocity is clamped for all moves that have reached or exceeded the maximum following error. Accordingly, for all remaining cycles, the clamped moves will operate according to the clamped motion profile. To that end, in a manner similar to step 308 of FIG. 3, the velocity controller 36 forwards a stop command to the trajectory generator 24. As noted above, the stop command includes data that, when received by the trajectory generator 24, causes the trajectory generator 24 to stop issuing commands (to the velocity compensation and torque compensation modules 28 and 30) to increase motor velocity.

The process then continues to step 708, in which the currently set velocity is incremented for other moves that have not reached or exceeded the maximum following error. The velocity controller 36 then determines at step 710 if more cycles remain. If the arm 16 has more cycles remaining, then the process repeats by looping back to step 700. Otherwise, the process ends.

For each move, this process of FIG. 7 thus effectively clamps the motor velocity to its maximum value when carrying a given payload. In alternative embodiments, instead of forwarding clamping the maximum velocity, the velocity controller 36 may forward a modify command to the trajectory generator 24. As noted above, when received, the modify command causes the trajectory generator 24 to recalculate trajectory information based upon the current velocity.

It should be noted that the functionality described above for different embodiments can be combined with other embodiments to further enhance performance. For example, the third embodiment can include functionality to monitor torque and issue a resume command if conditions warrant.

Figure 8:
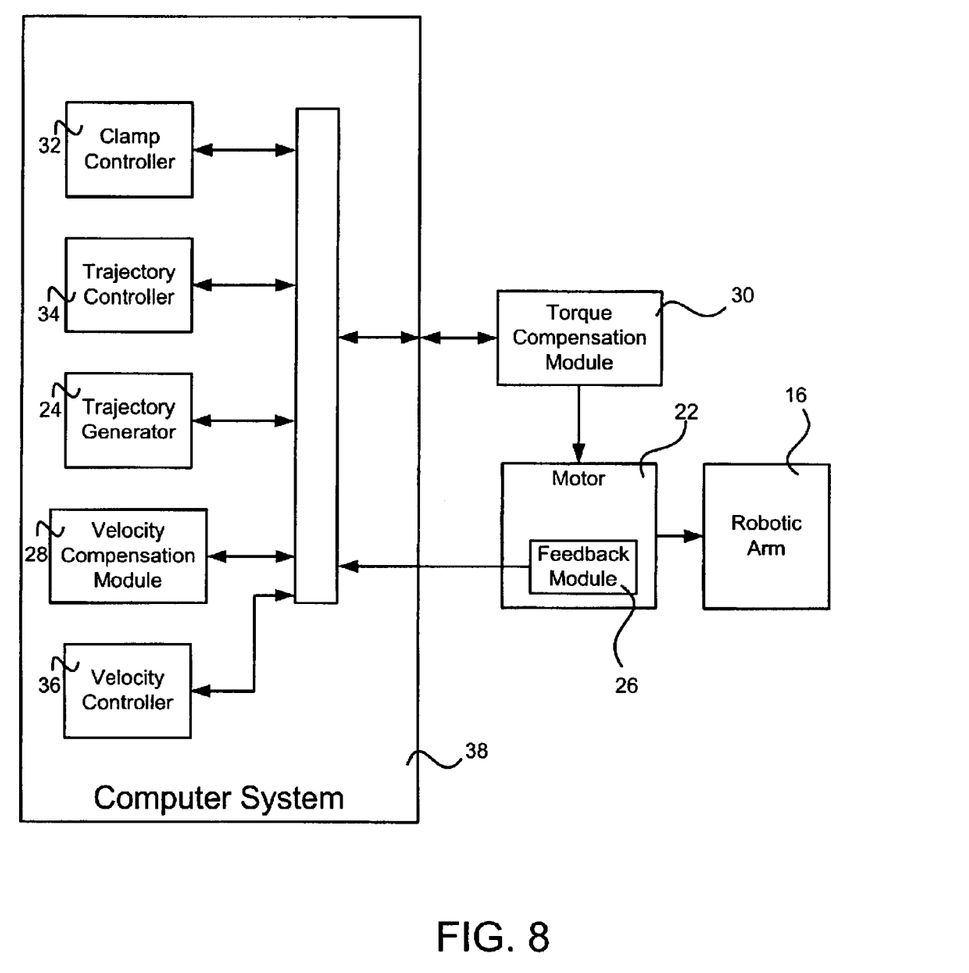
FIG. 8 schematically shows an exemplary robotic system that can be used to implement various embodiments of the invention.

FIG. 8 schematically shows one exemplary configuration for implementing the various components discussed above. Specifically, the system 20 includes the robotic arm 16 and its accompanying motor 22. As noted above, the motor 22 may be any conventional motor, such as a servo motor, and illustratively includes an encoder that implements the feedback module. In some embodiments, the encoder is encased within the motor 22. The system also includes the torque compensation module 30, which, in this example, is a separate hardware component housed within a cabinet external to the motor 22.

A conventional computer system (hereinafter "computer 38") may be used to contain the remaining modules. In particular, the computer 38 includes the clamp controller 32, the trajectory controller 34, the trajectory generator 24, the velocity compensation module 28, and the velocity controller 36. In illustrative embodiments, as discussed below, the clamp controller 32, trajectory controller 34, and velocity controller 36 each are implemented in software. Accordingly, they may be easily loaded into the computer 38. The trajectory generator 24 and velocity compensation module 28 illustratively are hardware elements within the computer 38. Moreover, in some embodiments, the computer 38 includes a sub-set of the components shown in FIG. 8. For example, a system implementing only the first embodiment may not include the trajectory controller 34 or velocity controller 36.

It should be reiterated, however, that the configuration shown in FIG. 8 is exemplary only and not intended to limit the scope of the invention. For example, the velocity compensation module 28 could be separated from the computer 38. Instead, it could be housed in the same housing as the torque compensation module 30. Moreover, the various controllers may be implemented in hardware, or by some other means.

The computer 38 may be any conventional computer system, such as an industrial computer. For example, the computer may be an industrial single board computer from Aaeon Technology Inc. of Taiwan, ROC. As known by those skilled in the art, such a computer system includes a plurality of components. Below is a brief description of some of those components. None of those components, however, are shown in FIG. 8.

In particular, the computer 38 includes a central processing unit (CPU) having a conventional microprocessor, random access memory (RAM) for temporary information storage, and read only memory (ROM) for permanent storage of read only information. A memory controller also is provided for controlling system RAM. Mass storage may be provided by known non-volatile storage media, such as a diskette, a digital versatile disk (not shown), a CD-ROM, or a hard disk. Data and software may be exchanged with the computer 38 via removable media, such as the diskette and the CD-ROM.

A visual display may be generated by a video controller, which controls a graphics card or accelerator and a display device. A network adapter also may be included to enable the computer 38 to be interconnected to a network via a network bus. The network, which may be a local area network (LAN), a wide area network (WAN), or the Internet, may use general purpose communication lines or wireless techniques to interconnect a plurality of network devices.

The computer system 38 is controlled and coordinated by operating system software, such as the LINUX™ operating system (available from Red Hat, Inc. of Raleigh, N.C.). Among other computer system control functions, the operating system controls allocation of system resources and performs tasks such as process scheduling, memory management, networking, and I/O services.

As noted above, various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as preprogrammed hardware elements (e.g., application specific integrated circuits, FPGAs, and digital signal processors), or other related components.

As also noted above, some embodiments of the invention may be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention are disclosed below, it should be apparent to those skilled in the art that various changes and modifications can be made that will achieve some of the advantages of the invention without departing from the true scope of the invention.

What is claimed is:

1. An apparatus for controlling a motor, the motor capable of moving an arm at an arm maximum velocity when the arm is carrying a given payload, the apparatus comprising:

an information input to receive motor performance information when the arm is carrying the given payload; and a controller operatively coupled with the information input, the controller capable of determining the arm maximum velocity from the motor performance information, the controller also being capable of causing the motor to move the arm at the arm maximum velocity; and an interface to forward messages to a trajectory generator that calculates trajectory information for the arm, wherein the trajectory generator attempts to increase motor velocity when the motor is not running at a predetermined velocity, and wherein the messages include a clamp message causing the trajectory generator to stop attempting to increase the motor velocity when the motor is not running at the predetermined velocity.

2. The apparatus as defined by claim 1 further including an increment module operatively coupled with the controller, the increment module being capable of increasing the motor velocity toward the arm maximum velocity in discrete amounts.

3. The apparatus as defined by claim 1 wherein the controller is capable of causing the motor to move the arm a predetermined amount less than the arm maximum velocity, the predetermined amount being a function of the arm maximum velocity.

4. The apparatus as defined by claim 1 wherein the messages further include a message including data that causes the trajectory generator to recalculate trajectory data based upon the maximum velocity.

5. The apparatus as defined by claim 1 further including a following error module capable of calculating following error of the motor, the following error of the motor being calculated as a function of the motor performance information, the arm maximum velocity being a function of the following error.

6. The apparatus as defined by claim 1 wherein the arm is a robotic arm.

7. A method of controlling a motor capable of moving an arm, the arm being capable of moving at an arm maximum velocity when carrying a given payload, the method comprising:

receiving motor performance information when the arm is carrying the given payload;

dynamically determining the arm maximum velocity based on the motor performance information; and causing the motor to move the arm at a velocity that is a function of the arm maximum velocity; and forwarding a clamp message to a trajectory generator that attempts to increase motor velocity when the motor is not running at a predetermined velocity, the clamp message causing the trajectory generator to stop attempting to increase the motor velocity when the motor is not running at the predetermined velocity.

8. The method as defined by claim 7 wherein dynamically determining includes:

calculating the following error of the motor; and determining if the following error equals or exceeds a maximum value.

9. The method as defined by claim 7 wherein dynamically determining includes repeatedly determining the arm maximum velocity as the arm moves during a single cycle.

10. The method as defined by claim 7 further including forwarding a trajectory message to a trajectory generator that calculates arm trajectory data, the trajectory message including data that causes the trajectory generator to recalculate trajectory data based upon the arm maximum velocity.

11. The method as defined by claim 7 further including increasing the motor velocity toward the arm maximum velocity in discrete amounts.

12. The method as defined by claim 7 wherein the arm is a robotic arm.

13. The method as defined by claim 7 wherein the motor moves the arm at a velocity that is a predetermined amount less than the arm maximum velocity.

14. A computer program product for use on a computer system for controlling a motor capable of moving an arm, the arm being capable of moving at an arm maximum velocity when carrying a given payload, the computer program product comprising a computer usable medium having computer readable program code thereon, the computer readable program code comprising:

program code for receiving motor performance information when the arm is carrying the given payload;

program code for dynamically determining the arm maximum velocity based on the motor performance information; and program code for causing the motor to move the arm at a velocity that is a function of the arm maximum velocity; and program code for forwarding a clamp message to a trajectory generator that attempts to increase motor velocity when the motor is not running at a predetermined velocity, the clamp message causing the trajectory generator to stop attempting to increase the motor velocity when the motor is not running at the predetermined velocity.

15. The computer program product as defined by claim 14 wherein the program code for dynamically determining includes:

program code for calculating the following error of the motor; and program code for determining if the following error equals or exceeds a maximum value.

16. The computer program product as defined by claim 14 wherein the program code for dynamically determining includes program code for repeatedly determining the arm maximum velocity as the arm moves during a single cycle.

17. The computer program product as defined by claim 14 further including program code for forwarding a trajectory message to a trajectory generator that calculates arm trajectory data, the trajectory message including data that causes the trajectory generator to recalculate trajectory data based upon the arm maximum velocity.

18. The computer program product as defined by claim 14 further including program code for increasing the motor velocity toward the arm maximum velocity in discrete amounts.

19. The computer program product as defined by claim 14 wherein the arm is a robotic arm.

20. The computer program product as defined by claim 14 further including program code for causing the motor to move the arm at a velocity that is a predetermined amount less than the arm maximum velocity.

* * * * *